United States Patent [19]

Leonard

[11] Patent Number: 4,593,719

[45] Date of Patent: Jun. 10, 1986

[54] SPOOL VALVE

[76] Inventor: Willie B. Leonard, 5902 Royalton, Houston, Tex. 77036

[21] Appl. No.: 676,702

[22] Filed: Nov. 30, 1984

[51] Int. Cl.[4] .......................................... F15B 13/043
[52] U.S. Cl. ........................... 137/625.66; 137/625.63; 137/625.64
[58] Field of Search ..................... 137/625.63, 625.64, 137/625.66

[56] References Cited

U.S. PATENT DOCUMENTS

| | | | |
|---|---|---|---|
| 2,600,348 | 6/1952 | Walthers | 137/625.63 X |
| 2,655,940 | 10/1953 | Jackson | 137/625.63 |
| 2,966,891 | 1/1961 | Williams | 137/625.66 X |
| 2,982,306 | 5/1961 | Fitzgibbon | 137/625.64 |
| 3,219,060 | 11/1965 | Pearl et al. | 137/625.66 X |
| 3,269,417 | 8/1966 | Lansky et al. | 137/625.64 |
| 3,339,572 | 9/1967 | Gordon et al. | 137/625.64 X |
| 3,502,109 | 3/1970 | Straight | 137/625.64 |
| 3,508,584 | 4/1970 | Kutik | 137/625.64 |
| 4,094,229 | 6/1978 | Leonard | |
| 4,319,609 | 3/1982 | Debrus | 137/625.63 |

FOREIGN PATENT DOCUMENTS

| | | | |
|---|---|---|---|
| 2445053 | 4/1976 | Fed. Rep. of Germany | 137/625.64 |
| 2307156 | 11/1976 | France | 137/625.64 |

OTHER PUBLICATIONS

Moog Drawing A31016 and Moog Pictorial Assembly 760 Series.

*Primary Examiner*—Gerald A. Michalsky
*Attorney, Agent, or Firm*—Murray Robinson; Ned Conley; David Rose

[57] ABSTRACT

A high frequency four-way valve reciprocated by hydromechanical amplifiers has its amplifier volumes volume compensated by passage means in each valve spool end connecting each amplifier volume with the adjacent outlet port. In a modification, there are longitudinally extending grooves on the outer periphery of each drive piston, one group of longitudinal grooves connecting the amplifier volume with the annular lubrication grooves around the piston and another group of longitudinal grooves connecting the annular grooves with the adjacent outlet port. The longitudinal grooves supply lubricant to the annular grooves, and also enhance the volume compensation.

6 Claims, 9 Drawing Figures

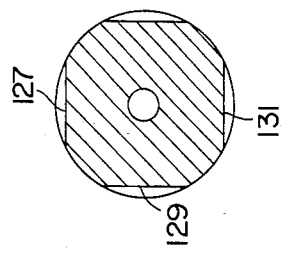
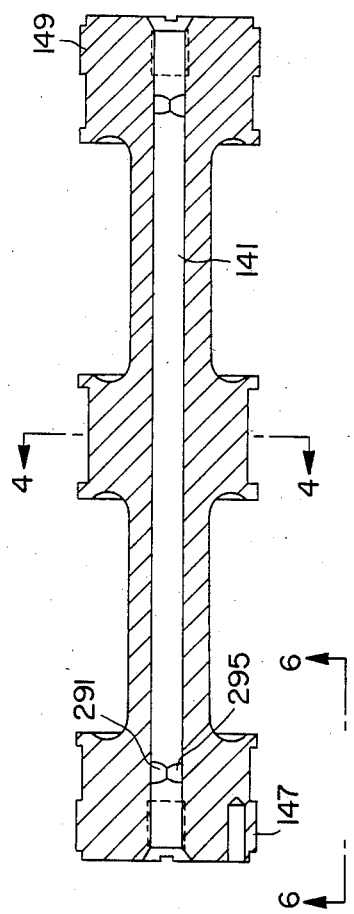
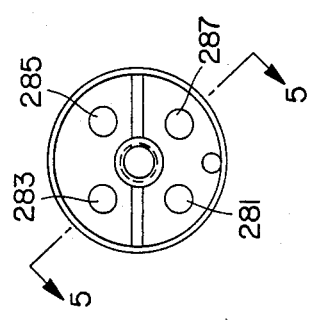
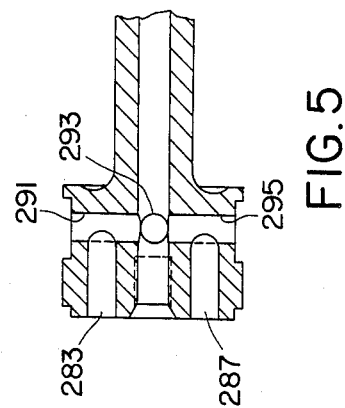
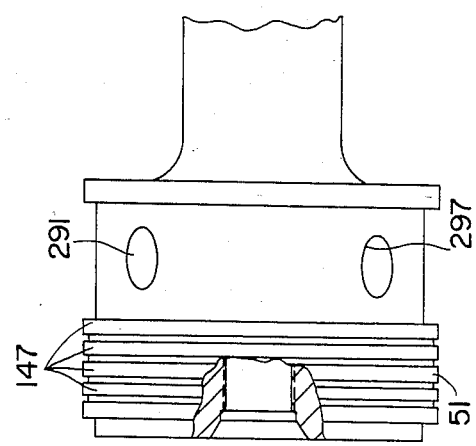

SPOOL VALVE

BACKGROUND OF THE INVENTION

This invention pertains to spool valves and more particularly to a four way valve including a body having a longitudinal cavity within which is a spool mounted for reciprocation longitudinally therein and having elements controlling flow of fluid between an inlet port in the body adapted for connection to a source of fluid, especially oil, under pressure, an outlet port in the body adapted to be connected to a reservoir of such fluid at a lower pressure than said source, and two flow ports adapted to supply and exhaust fluid from a fluid motor driving a Vibroseis seismic generator, the ends of the spool being driven by amplifier pistons moving in cylinders of smaller diameter than the closure or guide ends of the spool, such ends substantially sealing with said cavity.

The valve spool may reciprocate at e.g. 100 Hz to 300 Hz, with a stroke of e.g. 0.2 inch. If the spool sticks it usually galls and scores itself and the sleeve lining the body cavity, both of which are expensive to replace. To prevent such sticking, liners and sleeves of special bearing metals have been employed. Also, the spool ends have been provided with annular grooves to prevent pressure differential wall sticking and to assist in even distribution of lubricant provided by the oil whose flow is controlled by the valve. The spool has been lightened by boring out its axis, the ends of the bore then being plugged.

To prevent hydraulic lock of the spool due to accumulation of liquid in the amplifier volumes at the spool ends adjacent the drive pistons, the spool ends have been provided with diagonal bores extending from the amplifier volumes to the axial bore of the spool, the amplifier volume at one end of the spool being communicated by a port in the end cap of the body with the exterior of the body whereat is connected a pipe leading to the reservoir.

Despite all of the foregoing precautions the spools have still been subject to sticking.

SUMMARY OF THE INVENTION

According to the invention passage means is provided from each ampifier volume directly to the adjacent outlet port upstream of the reservoir whereby the flow path is shortened and resistance to fluid flow is reduced. Preferably the passage means comprises off axial passages connecting with the amplifier volume and with radial passages, the latter communicating with the outlet ports.

To enhance the action of the annular grooves about each spool end, especially as to lubrication, longitudinal grooves are provided in the peripheries of the spool ends transecting the annular grooves but not extending the full length of the spool ends, although with some connecting with the amplifier volume and some with the body cavity adjacent the outlet port means. Such longitudinal grooves conduct oil from the amplifier volumes and the outlet or low pressure ports of the valve body cavity to the annular grooves about the spool ends; in fact as the amplifier volume at one end reduces in size, oil will be pumped out of it to the adjacent annular grooves, and when the amplifier volume expands, fluid oil will flow from the adjacent low pressure port of the body cavity into the adjacent annular grooves of the spool end. It will be appreciated that this flow from the amplifier volume to the low pressure port of the body cavity is circuitous and therefore does not allow free flow past the spool ends, the oil being exhausted from the motor driven by the valve passing substantially in its entirety to the reservoir. However to the extent that these surface passages, longitudinal and annular, on the periphery of a spool end communicate the amplifier volumes and low pressure ports of the body cavity, they also assist in preventing hydraulic locking of the spool.

BRIEF DESCRIPTION OF THE DRAWINGS

For a detailed description of a preferred embodiment of the invention reference will now be made to the accompanying drawings wherein:

FIG. 2 is an axial section through the spool of the valve shown in FIG. 1;

FIG. 3 is left end view of the spool shown in FIG. 2;

FIG. 4 is a transverse section through the spool taken at plane 4—4 of FIG. 2;

FIG. 5 is a fragmentary axial section through the spool taken at plane 5—5 of FIG. 3;

FIG. 6 is a fragmentally side elevation, partly in section, of the spool shown in FIG. 2, viewed from plane 6—6, and its twice the scale of FIG. 2;

Except for the schematics, the drawings are to scale, and the conventions of the U.S. Patent and Trademark Office for patent cases have been used to indicate materials, from which it will be apparent that all parts are made of metal, e.g. steel, except for the O-ring seals, which are made of rubber.

DETAILED DESCRIPTION OF PREFERRED EMBODIMENTS

Body and Sleeve

Figure 1:
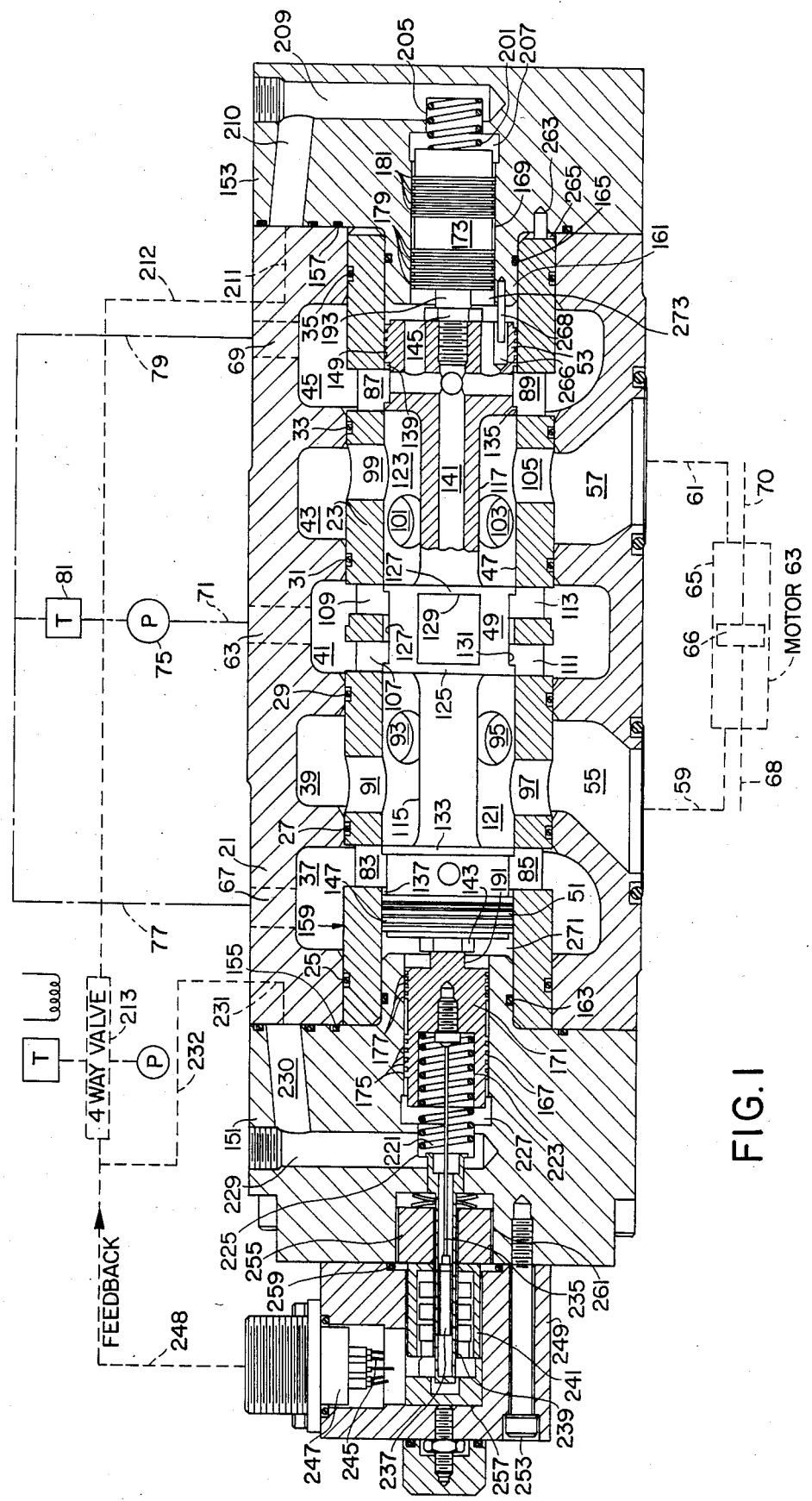
FIG. 1 is a sectional view of a spool valve embodying the invention, with associated fluid supply pump and reservoir and linear motor and connecting fluid conducting lines being shown schematically.

Referring now to FIG. 1 there is shown a spool valve according to the invention including a tubular body 21, a liner sleeve 23 being sealed thereto by a plurality of O-rings 25, 27, 29, 31, 33, 35. The body is provided with a plurality of annular chambers 37, 39, 41, 43, 45 extending about the sleeve in between the areas sealed by the O-rings.

The sleeve defines an elongated cavity 47 extending axially thereof within which is axially slidably mounted valve core or spool 49, the spool being adapted to reciprocate in response to varying forces at its ends 51, 53.

Flow Ports in Body

The body is provided with flow ports 55, 57 adapted to be connected by flow lines 59, 61 to an, e.g. linear, motor shown schematically at 63 as comprising a cylinder 65 and piston 66 and piston rods 68, 70. The spool valve controls flow of fluid (oil) to motor 63, supplying fluid via one of lines 59, 61, while exhausting it via the other line.

Inlet and Outlet Ports in Body

The body is provided with inlet port 63 and outlet ports 67, 69, (shown dotted since they are actually ninety degrees from the position shown and obscured by the sleeve). The inlet port is adapted to be connected by flow line 71 to a pump shown schematically at 75. The outlet ports are adapted to be connected by flow lines 77, 79 to reservoir or tank 81 that feeds pump P., the tank being at lower pressure than the pump outlet 71.

Sleeve Ports

The sleeve is provided with a plurality of radial ports in its wall, including rectangular cross-section ports such as ports 83, 85 which communicate with outlet chamber 37 and rectangular cross section ports such as ports 87, 89 which communicate with outlet chamber 45; also circular cross-section ports such as ports 91, 93, 95, 97 which communicate with left flow chamber 39 and circular cross-section ports such as 99, 101, 103, 105 which communicate with right flow chamber 43; also rectangular cross-section ports such as ports 107, 109, 111, 113 which communicate with inlet chamber 41.

Spool Stems

Spool 49 includes left and right stem portions 115, 117 of smaller outer diameter than the inner diameter of the sleeve leaving left and right annular volumes 121, 123 thereabout, volume 121 interconnecting the sleeve ports that communicate with the left flow chamber 39, and volume 123 interconnecting the sleeve ports that communicate with the right flow chamber 43.

Inlet Closure Elements

Between the left and right stem portions 115, 117 is a central spool port, including left and right cylindrical lands 125, 127 which in the centered position shown in FIG. 1 block flow from inlet chamber 41 to both flow chambers 39 and 43. When the spool moves to the right or left, a flow path is opened to one or the other flow lines 59, 61 from Pump P.

The central spool port has four flat sides disposed at 90 degrees to each other (see also FIG. 4), three of which are shown in FIG. 1 at 127, 129, 131, which communicate the inner ends of sleeve ports 107, 109, 111, 113 that lead through the sleeve from inlet chamber 41.

Outlet Closure Elements

Near the ends of the spool are cylindrical lands 133, 135 which in the centered position shown block flow from both flow chambers 39, 43 to outlet chambers 37, 45. When the spool moves to the right or to the left, a flow path is opened between one or the other of flow lines 59, and reservoir tank 81.

Spool Ends

Just beyond lands 133, 135 the spool has a smaller outer diameter than the inner diameter of the sleeve forming left and right outlet volumes 137, 139 which communicate the inner ends of ports 83, 85 on the left and of the sleeve and which communicate the inner ends of ports 87, 89 at the right end of the sleeve respectfully.

An axial passage 141 in the spool is closed at each end by cap screws 143, 145. This passage lightens the spool, making it easier to reciprocate at high frequency.

Spool ends 51, 53 fit slidably within the ends of sleeve 23 and serve to centralize and guide the spool in its reciprocation within the body sleeve. The outer periphery of each of the spool ends is provided with a plurality of annular grooves, 147, 149, as best shown in FIG. 6. These grooves accumulate oil moving along the interior of the sleeve from outlet volumes 137, 139 and insure that such oil is constantly spread over the inner surfaces of the sleeve and the outer surfaces of the spool ends to lubricate their reciprocation within the sleeve.

Drive Pistons

The ends of the tubular body are closed by end caps 151, 153 secured thereto, e.g. by cap screws not shown, and sealed thereto by O-rings 155, 157. Cylindrical bosses 159, 161 on the end caps extend into the sleeve ends and are sealed thereto by O-rings 163, 165. Bosses 159, 161 define the ends of cavity 47.

Cylindrical bores 167, 169 within the end caps form cylinders receiving drive pistons 171, 173 respectively. The outer peripheries of the drive pistons are smaller than the inner diameters of the cylinder, to allow free reciprocation of the pistons within the cylinder, except each piston is provided with groups of cylindrical lands 175, 177, 179, 181 fitting closely within the respective cylinders to guide the pistons and to seal them to the cylinders to prevent fluid flow therepast.

The drive pistons are provided with rods 191, 193 which abuttingly engage cap screws 143, 145 respectively, whereby reciprocation of the drive pistons will reciprocate the spool.

Drive Means

At the right hand end of the valve, a helical compression spring 201 is provided between a socket (like socket 223 infra) in drive piston 173 and pilot bore 205 at the end of cylinder bore 169. Spring chamber 207 is connected by passages 209, 210, 211, and 212 to four way valve 213 which in response to suitable electric control (see FIG. 1 of U.S. Pat. No. 4,094,229) supplies and exhausts pressure fluid, e.g. oil, to and from chamber 207.

At the left hand end of the valve, a helical compression spring 221 is provided between socket 223 at the left hand end of drive piston 171 and pilot bore 225 at the end of cylinder bore 167. Spring chamber 227 is connected by passages 229, 230, 231, and 232 to four way valve 213 which in response to suitable electric control supplies and exhausts pressure fluid, e.g. oil, to and from chamber 227.

Feedback Signal Generator

Drive piston 171 is connected by a small diameter piston rod 235 to armature cylinder or slug of ferromagnetic material 237 which is mounted for reciprocation in tube 239 within LVDT solenoid coil 241. Slug movement generates a signal proportional to spool motion. The signal is conducted to the outside by wires 245 and cable 247 and is fed back via cable 248 to electrically driven valve 213. See FIG. 42 of U.S. Pat. No. 4,092,229. The LVDT unit comprising slug 237 and coil 241 is mounted in housing 249 secured to end cap 151 by cap screws, one of which is shown at 253. Spacers 255, 257 mount the LVDT unit within the housing. The housing is sealed by O-ring 259 about bore 261 through end cap 151 through which piston rod 235 passes to connect to drive piston 171.

Alignment Means

To position sleeve 23 azimuthally so that its ports register best with the flow ports and inlet and outlet ports of the body, an alignment means is provided comprising a pin 263 extending from end cap 153 into a slot 265 in the sleeve. To position the spool azimuthally so that it does not rotate within the sleeve, an alignment means is provided comprising a socket 266 in the spool loosely receiving a pin 268 extending from end cap 153. Such means could be provided at the other end of the spool if desired, as shown in FIG. 2.

Motion Amplifier

Each drive piston 171 and 173 is of smaller cross-sectional area than the spool end 51 or 53 which it drives. The volume of oil required to move the drive pistons a given distance is therefore less than would be required if the driving fluid were applied directly to the spool ends. The drive pistons therefore serve as motion amplifiers. However the amplifier volumes 271, 273 between the pistons and spool ends vary in size as the pistons and spool reciprocate, due to the differences in their cross-sectional areas.

Volume Compensator

In order to compensate for the volume changes the amplifier volumes have heretofore been connected back to the tank by providing the spool ends with diagonal passage means connecting the spool's axial flow passage with the amplifier volumes eccentric to the cap screws closing the axial flow passages, and connecting the amplifier volume at the right hand end with a passage through the end cap leading to an external line.

According to the invention each spool end is provided with a plurality of off axial passages as shown for the left hand spool end at 281, 283, 285, 287, in FIGS. 3, 5, and 6, similar off axial passage being provided for the right hand spool end. The four off axial passages connect with outlet volumes 137, 139 via four radial passages such as shown for the left hand spool end at 291, 293, 295, 297. Similar radial passages are provided in the right hand spool end. If desired, and as shown, these radial passages can extend inwardly and connect to axial passage 141.

Modification

Figure 7:
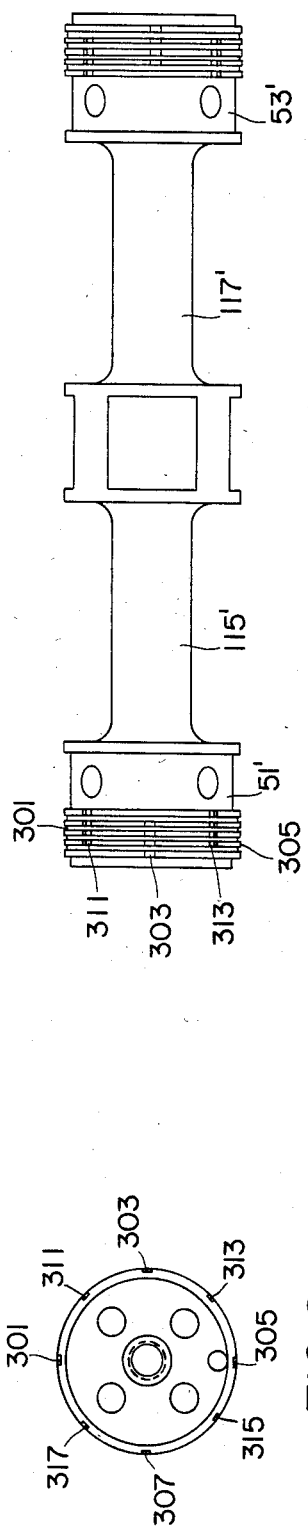
FIG. 7 is an elevational view of a spool similar to that of FIG. 2 but showing a modification.
Figure 9:
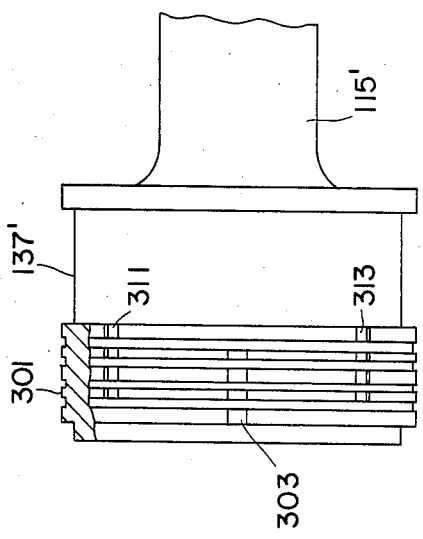
FIG. 9 is a fragmentary side elevation, partly in section, of the left end of the spool shown in FIG. 7, but to twice the scale of FIG. 7.
Figure 8:
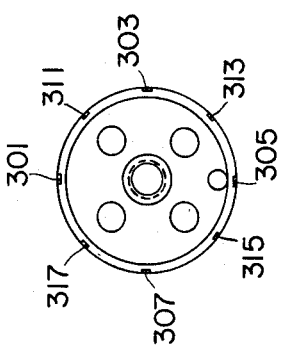
FIG. 8 is a left end view of the spool shown in FIG. 7.

Referring now to FIG. 7-9, a plurality of grooves parallel to the spool axis may be provided on the outer periphery of each spool end. The spool ends and other parts are given the same numbers as in the FIGS. 1-6 embodiment except primed, since they are the same except for the last mentioned grooves. The latter transect the annular grooves 147, 149 about the spool ends. These transecting grooves at each end are in two groups, one group comprising four grooves, such as shown for the left hand spool end in FIGS. 8 and 9, identified as grooves 301, 303, 305, 309 disposed 90 degrees apart about the spool end periphery, extending from the end face of the spool end inwardly to the groove nearest the outlet volume 137. The other group of transecting grooves comprises four grooves 311, 313, 315, 317, also spaced apart azimuthally by ninety degrees and disposed midway between the grooves of the first group. The second set of grooves extend from outlet volume 137' all the way to the annular groove nearest the end face of the spool end. The same construction of transecting grooves is provided for the right hand spool end.

The transecting grooves serve to supply lubricant to the annular grooves around the spool ends, in fact a pumping action is achieved between each amplifier volume and the adjacent outlet volume. This groove arrangement also serves to volume compensate the amplifier volumes, as in the first embodiment; although, as shown, the transecting passages not extending directly all the way across the length of the guide portions of the spool end, are more restrictive of flow than they would be if they did so extend, for which reason they are preferably used in combination with the off-axial and radial passages of the FIGS. 1-6 embodiment.

While preferred embodiments of the invention have been shown and described, modifications thereof can be made by one skilled in the art without departing from the spirit of the invention.

Evolution of the Invention

The first test valve incorporating both the prior art volume compensation and that of FIG. 1-6 was sent out for test, without charge, in about September or October of 1983, and was returned. A second test valve like the first one was sent out for test, without charge, in about October of 1983, and was returned. An order for end caps without the prior art port means for connecting external volume compensator flow line means was placed about Nov. 1, 1983, and they were delivered about Jan. 12, 1984. A valve incorporating the FIG. 1-6 volume compensation was sold in February 1984. It is believed that this sale was made to an order solicited by telephone about a month before. The FIGS. 7-9 embodiment has not yet been built.

I claim:
1. Spool valve comprising:
a body having an elongated cavity, a spool longitudinally reciprocably mounted in said cavity,
said body having a central inlet port adapted for connection to a source of pressure fluid, near each end of the cavity an outlet port adapted for connection to a volume of lower pressure than said source, and two flow ports one at each side of said inlet port between the inlet port and one of said outlet ports, each flow port being adapted to be connected to a motor,
cooperable means on said body and spool controlling fluid flow through said body between said ports, said means comprising a plurality of annular lands on said spool, there being such a land between each adjacent pair of said ports,
said spool having at each end annular guide means engaging the inner periphery of the cavity next to the adjacent end of the cavity,
said valve including two actuation means, one at each end of the spool and each including:
a cylinder formed in said body communicating with one end of said cavity, with the cylinder axis extending in the same direction as the line of reciprocation of the spool, and a piston mounted in the cylinder for reciprocation along the cylinder axis and operatively associated with the end of said spool at said one end of the cavity to move said spool away from said cylinder when said piston is moved toward the other end of said cavity,
said cylinder and cavity having different cross-sectional areas adjacent the junction of said piston and spool whereby the volume defined by said cylinder and cavity between said piston and spool varies according to the position of said spool as it is reciprocated within said cavity, and passage means at each end of the spool disposed entirely within the inner periphery of said cavity and extending through the guide means at the respective end of the spool and communicating with the outlet port near that end of the body in all positions of said spool relative to said body, thereby connecting said volume directly with the last said outlet port upstream from where it is adapted for connection to said volume of lower pressure.

2. Valve according to claim 1 wherein each said passage means includes an annular peripheral groove in the spool between the respective guide means and the annular land adjacent thereto, and all of the remainder of each said passage means lies interiorly of said guide means.

3. Valve according to claim 2 wherein said remainder of said passage means comprises a plurality of off-axial passages in the guide means extending inwardly from the end of the spool, and a plurality of radial passages connecting said off-axial passages with said annular peripheral groove.

4. Valve according to claim 1 wherein each said passage means is between said body and the spool adjacent to the outer periphery of the guide means and exposed at one side to said elongated cavity in the body.

5. Valve according to claim 4 wherein each said guide means is provided with a plurality of annular grooves on its outer periphery and said passage means each comprises longitudinally extending groove means on said cylindrical portion transecting said annular grooves.

6. Valve according to claim 5, said longitudinal groove means each comprising a plurality of longitudinal grooves each of which extends less than all of the length of said guide means but each of which extends all the way to one end of said guide means.

* * * * *

UNITED STATES PATENT AND TRADEMARK OFFICE
CERTIFICATE OF CORRECTION

PATENT NO. : 4,593,719
DATED : JUNE 10, 1986
INVENTOR(S) : WILLIE B. LEONARD

It is certified that error appears in the above—identified patent and that said Letters Patent is hereby corrected as shown below:

On Column 2, line 30, after "and" change "its" to -- is --.

On Column 3, line 63, before "of" change "and" to -- end --.

Signed and Sealed this

Sixteenth Day of September 1986

[SEAL]

Attest:

DONALD J. QUIGG

Attesting Officer

Commissioner of Patents and Trademarks